(12) United States Patent
Morotomi et al.

(10) Patent No.: US 11,541,883 B2
(45) Date of Patent: Jan. 3, 2023

(54) VEHICLE DRIVING ASSIST APPARATUS

(71) Applicant: TOYOTA JIDOSHA KABUSHIKI KAISHA, Toyota (JP)

(72) Inventors: Kohei Morotomi, Miyoshi (JP);
Hirotaka Hatakeyama, Nagoya (JP);
Yuhei Miyamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 312 days.

(21) Appl. No.: 16/535,916

(22) Filed: Aug. 8, 2019

(65) Prior Publication Data

US 2020/0047749 A1  Feb. 13, 2020

(30) Foreign Application Priority Data

Aug. 10, 2018 (JP) .............................. JP2018-151843

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0953* (2013.01); *B60W 30/0956* (2013.01); *B60W 50/082* (2013.01); *B60W 50/10* (2013.01)

(58) Field of Classification Search
CPC ............. B60W 30/09; B60W 30/0953; B60W 30/0956; B60W 50/082; B60W 50/10;
(Continued)

(56) References Cited

U.S. PATENT DOCUMENTS

2008/0065328 A1* 3/2008 Eidehall ................. G01S 7/295
701/301
2008/0255729 A1* 10/2008 Ichinose .............. B62D 15/025
701/42
(Continued)

FOREIGN PATENT DOCUMENTS

DE  102013216931 A1  2/2015
JP  2008-168784 A  7/2008
(Continued)

OTHER PUBLICATIONS

Communication dated Jan. 15, 2020 from the European Patent Office in application No. 19187627.5.

*Primary Examiner* — Jeff A Burke
*Assistant Examiner* — Sihar A Karwan
(74) *Attorney, Agent, or Firm* — Sughrue Mion, PLLC

(57) ABSTRACT

A vehicle driving assist apparatus of the invention starts a collision avoidance steering assist control to automatically steer the vehicle to avoid a collision of the vehicle with the obstacle in response to a driver performing a collision avoidance steering operation for avoiding the collision when there is a possibility that the vehicle collides with the obstacle. The vehicle driving assist apparatus cancels the collision avoidance steering assist control in response to the driver performing a counter collision avoidance steering operation against automatically steering the vehicle intended to be achieved by the collision avoidance steering assist control after a first predetermined time elapses from starting the collision avoidance steering assist control. The vehicle driving assist apparatus continues the collision avoidance steering assist control until the first predetermined time elapses from starting the collision avoidance steering assist control even when the driver performs the counter collision avoidance steering operation.

13 Claims, 7 Drawing Sheets

(51) Int. Cl.
*B60W 50/08* (2020.01)
*B60W 50/10* (2012.01)

(58) Field of Classification Search
CPC .............. B60W 50/12; B60W 30/12; B60W 2710/202; B60W 2540/18; B60W 2050/0091; B60W 2520/10; B60W 2520/105; B60W 2520/125; B60W 2520/14; B60W 2520/28; B60W 2540/12; B62D 15/0265
See application file for complete search history.

(56) References Cited

U.S. PATENT DOCUMENTS

| | | | | |
|---|---|---|---|---|
| 2008/0281521 | A1* | 11/2008 | Shirato | B60W 10/20 701/301 |
| 2008/0319612 | A1 | 12/2008 | Kudo | |
| 2010/0030426 | A1* | 2/2010 | Okita | B60T 7/22 701/41 |
| 2014/0309884 | A1* | 10/2014 | Wolf | B60W 10/18 701/41 |
| 2017/0057498 | A1 | 3/2017 | Katoh | |
| 2018/0326979 | A1* | 11/2018 | Tsuruoka | B60W 10/20 |
| 2021/0046936 | A1* | 2/2021 | Umeda | B60W 10/20 |

FOREIGN PATENT DOCUMENTS

| | | | |
|---|---|---|---|
| JP | 2013-129328 A | | 7/2013 |
| JP | 2013-246768 A | | 12/2013 |
| JP | 2017-043262 A | | 3/2017 |

\* cited by examiner

VEHICLE DRIVING ASSIST APPARATUS

BACKGROUND

Field

The invention relates to a vehicle driving assist apparatus having a function of assisting an operation performed by a driver of a vehicle to drive the vehicle to avoid a collision of the vehicle with an obstacle.

Description of the Related Art

There is known a vehicle driving assist apparatus for executing a collision avoidance assist control. For example, there is known the collision avoidance assist control for avoiding a collision of a vehicle with an obstacle by automatically braking the vehicle when the obstacle is detected by surrounding sensors such as camera sensors and radars. In addition, there is known the vehicle driving assist apparatus for avoiding the collision of the vehicle with the obstacle by automatically steering the vehicle. For example, the vehicle driving assist apparatus suggested in JP 2017-43262 A calculates a target steering angle for causing the vehicle to move along a target collision avoidance path acquired for avoiding the collision of the vehicle with the obstacle and activates a steering motor to achieve the target steering angle to steer wheels-to-be-steered of the vehicle.

The vehicle driving assist apparatus suggested in JP 2017-43262 A executes an automatic steering control to automatically steer the vehicle to cause the vehicle to move along the target collision avoidance path. When this vehicle driving assist apparatus detects an operation performed by a driver of the vehicle for turning a steering wheel during an execution of the automatic steering control, the vehicle driving assist apparatus cancels the execution of the automatic steering control. In this case, the operation performed by the driver for steering the vehicle is not assisted by the automatic steering control.

SUMMARY

The invention has been made for solving problems described above. An object of the invention is to provide a vehicle driving assist apparatus which can assist the operation performed by the driver for steering the vehicle for avoiding the collision of the vehicle with the obstacle appropriately. Hereinafter, the operation performed by the driver for steering the vehicle will be referred to as "the steering operation performed by the driver" or "the driver's steering operation".

The vehicle driving assist apparatus according to the invention comprises at least one sensor and an electronic control unit. The at least one sensor detects an obstacle existing around a vehicle to which the vehicle driving assist apparatus is applied.

The electronic control unit is configured to start an execution of a collision avoidance steering assist control to automatically steer the vehicle to avoid a collision of the vehicle with the detected obstacle in response to a driver of the vehicle performing a collision avoidance steering operation for steering the vehicle for avoiding the collision of the vehicle with the detected obstacle when there is a possibility that the vehicle collides with the detected obstacle.

The electronic control unit is further configured to cancel the execution of the collision avoidance steering assist control in response to the driver performing a counter collision avoidance steering operation for steering the vehicle against automatically steering the vehicle intended to be achieved by the collision avoidance steering assist control after a first predetermined time elapses from starting the execution of the collision avoidance steering assist control.

The electronic control unit is further configured to continue the execution of the collision avoidance steering assist control until the first predetermined time elapses from starting the execution of the collision avoidance steering assist control even when the driver performs the counter collision avoidance steering operation.

According to the invention, the obstacle existing around the vehicle is detected by the at least one sensor. The electronic control unit determines whether the driver performs the collision avoidance steering operation when there is the possibility that the vehicle collides with the detected obstacle. For example, the electronic control unit determines that there is the possibility that the vehicle collides with the detected obstacle when an index value representing the possibility that the vehicle collides with the detected obstacle exceeds a certain reference level. In addition, for example, the electronic control unit determines that the driver performs the collision avoidance steering operation when (i) the driver performs an operation to turn a steering wheel of the vehicle for avoiding the collision of the vehicle with the detected obstacle, and (ii) a turning rate of turning the steering wheel by the driver is greater than a certain reference rate, based on at least one of turning-operation-related parameters. The turning-operation-related parameters are, for example, (i) a steering torque generated by the driver's steering operation to turn the steering wheel, (ii) the turning rate of turning the steering wheel by the driver, and (iii) a turning angle realized by the driver's steering operation to turn the steering wheel.

Further, according to the invention, the execution of the collision avoidance steering assist control is started when (i) there is the possibility that the vehicle collides with the detected obstacle, and (ii) the driver performs the collision avoidance steering operation.

Thereby, the execution of the collision avoidance steering assist control is started, based on a driver's intention represented by the driver's steering operation.

When the driver performs the counter collision avoidance steering operation, the execution of the collision avoidance steering assist control should be preferably cancelled in consideration of the driver's intention represented by the counter collision avoidance steering operation. According to the invention, basically, the execution of the collision avoidance steering assist control is cancelled when (i) the collision avoidance steering assist control is executed, and (ii) the driver performs the counter collision avoidance steering operation.

The counter collision avoidance steering operation is the driver's steering operation against automatically steering the vehicle targeted by the collision avoidance steering assist control. In particular, the counter collision avoidance steering operation is the driver's steering operation to turn the steering wheel for turning the vehicle in a direction opposite to a direction of turning the vehicle intended to be achieved by the collision avoidance steering assist control. In this regard, the counter collision avoidance steering operation may include the driver's steering operation of holding the steering wheel when the collision avoidance steering assist control intends to turn the vehicle by a certain degree equal to or greater than a predetermined degree. In addition, the counter collision avoidance steering operation may include the driver's steering operation to turn the steering wheel with a certain level of torque equal to or greater than a predetermined torque when the collision avoidance steering assist control intends to maintain the steering angle at the present steering angle.

When the driver realizes that the vehicle approaches the detected obstacle rapidly, the driver may not perform any steering operations since the driver gets upset or stiffened. In this case, the driver may stop turning the steering wheel and hold the steering wheel. Alternatively, the driver may turn the steering wheel conversely. Therefore, the driver may not perform any steering operations appropriately. In this case, the driver's steering operation is deemed as the counter collision avoidance steering operation. If the execution of the collision avoidance steering assist control is always cancelled in response to the driver performing the counter collision avoidance steering operation, the driver cannot be assisted appropriately by the collision avoidance steering assist control. In particular, although the driver intends to steer the vehicle for avoiding the collision of the vehicle with the detected obstacle, the driver cannot be assisted by the collision avoidance steering assist control.

According to the invention, the execution of the collision avoidance steering assist control continues until the first predetermined time elapses from starting the execution of the collision avoidance steering assist control even when the driver performs the counter collision avoidance steering operation. Thereby, even if the driver unintentionally performs the counter collision avoidance steering operation, the execution of the collision avoidance steering assist control is not cancelled until the first predetermined time elapses from starting the execution of the collision avoidance steering assist control.

Thereby, the driver can be assisted by the collision avoidance steering assist control until the first predetermined time elapses from starting the execution of the collision avoidance steering assist control even when the driver performs the counter collision avoidance steering operation. In addition, the steering wheel is turned by the collision avoidance steering assist control. This process to turn the steering wheel by the collision avoidance steering assist control leads to the driver's steering operation to turn the steering wheel in accord with steering the vehicle intended to be achieved by the collision avoidance steering assist control. Therefore, a period of time until the first predetermined time elapses from starting the execution of the collision avoidance steering assist control is a period of time for guiding the driver's steering operation to an appropriate operation. In addition, the period of time until the first predetermined time elapses from starting the execution of the collision avoidance steering assist control is a period of time for determining whether the driver intends to steer the vehicle for avoiding the collision of the vehicle with the detected obstacle.

When the driver does not perform the counter collision avoidance steering operation after the first predetermined time elapses, the execution of the collision avoidance steering assist control continues. On the other hand, when the driver performs the counter collision avoidance steering operation after the first predetermined time elapses, the execution of the collision avoidance steering assist control is cancelled. Therefore, the collision avoidance steering assist control is executed without interrupting the driver's steering operation.

As a result, according to the invention, the driver's steering operation for avoiding the collision of the vehicle with the detected obstacle can be appropriately assisted by the collision avoidance steering assist control. For example, even when the steering torque generated by the driver's steering operation is smaller than the steering torque necessary to avoid the collision of the vehicle with the detected obstacle, the steering torque generated by the collision avoidance steering assist control is appropriately added to the steering torque generated by the driver's steering operation for avoiding the collision of the vehicle with the detected obstacle. Thus, the driver can avoid the collision of the vehicle with the detected obstacle appropriately. In addition, the collision avoidance steering assist control assists the driver's steering operation in accord with the driver's intention represented by the driver's steering operation for avoiding the collision of the vehicle with the detected obstacle. Thus, the driver can be prevented from feeling the discomfort.

According to an aspect of the invention, the electronic control unit may be further configured to terminate the execution of the collision avoidance steering assist control and start an execution of a lane return steering assist control to automatically steer the vehicle to return the vehicle into an original movement lane in which the vehicle moved before the electronic control unit starts the execution of the collision avoidance steering assist control in response to the vehicle having avoided the collision with the detected obstacle.

According to this aspect, the electronic control unit may be further configured to cancel the execution of the lane return steering assist control in response to the driver performing a counter lane return steering operation for steering the vehicle against automatically steering the vehicle intended to be achieved by the lane return steering assist control after a second predetermined time elapses from starting the execution of the lane return steering assist control.

According to this aspect, the electronic control unit may be further configured to continue the execution of the lane return steering assist control until the second predetermined time elapses from starting the execution of the lane return steering assist control even when the driver performs the counter lane return steering operation.

When the collision avoidance steering assist control is executed, the vehicle is automatically steered to avoid the collision of the vehicle with the detected obstacle. Thus, the vehicle is moved toward an outside of the original movement lane by the collision avoidance steering assist control. Therefore, when the vehicle has avoided the collision with the obstacle, there is a need to return the direction of movement of the vehicle, for example, to a direction parallel to a direction of extension of the original movement lane for preventing the vehicle from departing from the original movement lane. According to this aspect of the invention, the execution of the collision avoidance steering assist control is terminated and then, the execution of the lane return steering assist control is started to automatically steer the vehicle so as to prevent the vehicle from departing from the original movement lane when the vehicle has avoided the collision with the detected obstacle.

When the driver performs the counter lane return steering operation, the execution of the lane return steering assist control should be preferably cancelled in consideration of the driver's intention represented by the driver's counter lane return steering operation. According to this aspect of the invention, basically, the execution of the lane return steering assist control is cancelled in response to the driver performing the counter lane return steering operation.

The counter lane return steering operation is the driver's steering operation against automatically steering the vehicle intended to be achieved by the lane return steering assist control. In particular, the counter lane return steering operation is the driver's steering operation to turn the steering wheel in a direction opposite to a direction of steering the vehicle intended to be achieved by the lane return steering assist control. In this regard, the counter lane return steering operation may include the driver's steering operation of holding the steering wheel when the lane return steering assist control intends to turn the vehicle by a certain degree equal to or greater than a predetermine degree. In addition, the counter lane return steering operation may include the driver's steering operation to turn the steering wheel with a certain torque equal to or greater than a predetermined torque when the lane return steering assist control intends to maintain the steering angle at the present steering angle.

The driver may start to turn the steering wheel for returning the vehicle into the original movement lane at a late point of time. In other words, the driver may start to turn the steering wheel for preventing the vehicle from departing from the original movement lane at the late point of time. In this case, the driver's steering operation is temporarily against automatically steering the vehicle intended to be achieved by the lane return steering assist control. It follows that the driver's steering operation is deemed as the counter lane return steering operation. If the execution of the lane return steering assist control is always cancelled in response to the driver performing the counter lane return steering operation, the driver's steering operation for returning the vehicle into the original movement lane is not assisted by the lane return steering assist control.

According to this aspect of the invention, the execution of the lane return steering assist control continues until the second predetermined time elapses from starting the execution of the lane return steering assist control even when the driver performs the counter lane return steering operation. In other words, the execution of the lane return steering assist control is not cancelled before the second predetermined time elapses from starting the execution of the lane return steering assist control even when the driver unintentionally performs the counter lane return steering operation.

Thereby, the driver's steering operation for returning the vehicle into the original movement lane can be assisted by the lane return steering assist control until the second predetermined time elapses from starting the execution of the lane return steering assist control. In addition, the steering wheel is turned by the lane return steering assist control until the second predetermined time elapses. This process to turn the steering wheel by the lane return steering assist control leads to the driver's steering operation to turn the steering wheel in accord with steering the vehicle intended to be achieved by the lane return steering assist control. Therefore, a period of time until the second predetermined time elapses is a period of time for guiding the driver's steering operation to an appropriate operation. In addition, the period of time until the second predetermined time elapses is a period of time for determining whether the driver intends to steer the vehicle for returning the vehicle into the original movement lane.

When the driver does not perform the counter lane return steering operation after the second predetermined time elapses, the execution of the lane return steering assist control continues. On the other hand, when the driver performs the counter lane return steering operation after the second predetermined time elapses, the execution of the lane return steering assist control is cancelled. Thereby, the lane return steering assist control can be executed without interrupting the driver's steering operation.

As a result, according to this aspect of the invention, the driver's steering operation for returning the vehicle into the original movement lane can be appropriately assisted by the lane return steering assist control after the execution of the collision avoidance steering assist control is terminated. For example, even when the steering torque generated by the driver's steering operation for returning the vehicle into the original movement lane is smaller than the steering torque necessary for returning the vehicle into the original movement lane, the steering torque generated by the lane return steering assist control is added to the steering torque generated by the driver's steering operation for returning the vehicle into the original movement lane. Thus, the vehicle can be prevented from departing from the original movement lane. In addition, the lane return steering assist control assists the driver's steering operation in accord with the driver's intention represented by the driver's steering operation for returning the vehicle into the original movement lane. Thus, the driver can be prevented from feeling the discomfort.

According to another aspect of the invention, the electronic control unit may be configured to continue the execution of the collision avoidance steering assist control during a predetermined period of time before the electronic control unit starts the execution of the lane return steering assist control even when the driver performs the counter collision avoidance steering operation.

For example, the driver may start to perform a lane return steering operation for steering the vehicle for returning the vehicle into the original movement lane just before the execution of the collision avoidance steering assist control is terminated, and the execution of the lane return steering assist control is started. In this case, the driver's lane return steering operation may be deemed as the counter collision avoidance steering operation. If the execution of the collision avoidance steering assist control is always cancelled in response to the driver performing the lane return steering operation just before the execution of the collision avoidance steering assist control is terminated, it follows that the lane return steering assist control is not executed since the execution of the collision avoidance steering assist control is cancelled.

According to this aspect of the invention, the execution of the collision avoidance steering assist control continues during the predetermined period of time before the execution of the lane return steering assist control is started even when the driver performs the counter collision avoidance steering operation. Thereby, the driver's steering operation for returning the vehicle into the original movement lane can be appropriately assisted by the lane return steering assist control even when the driver starts to perform the lane return steering operation at an early point of time.

According to further another aspect of the invention, the predetermined period of time may correspond to a period of time between a predetermined point of time before the electronic control unit starts the execution of the lane return steering assist control and a point of time when the electronic control unit starts the execution of the lane return steering assist control.

According to further another aspect of the invention, the electronic control unit may be configured to limit a steering torque for automatically steering the vehicle generated by the collision avoidance steering assist control to a collision avoidance steering torque upper limit. According to this aspect, the collision avoidance steering torque upper limit is set to a value that the driver can perform the counter collision avoidance steering operation when the steering torque for automatically steering the vehicle generated by the collision avoidance steering assist control is limited to the collision avoidance steering torque upper limit.

The execution of the collision avoidance steering assist control continues until the first predetermined time elapses from starting the execution of the collision avoidance steering assist control even when the driver performs the counter collision avoidance steering operation. According to this aspect of the invention, the collision avoidance steering torque upper limit is set to the value that the driver can perform the counter collision avoidance steering operation against the steering torque generated by the collision avoidance steering assist control even when the steering torque generated by the collision avoidance steering assist control corresponds to the collision avoidance steering torque upper limit. Therefore, the driver can perform the counter collision avoidance steering operation against automatically steering the vehicle intended to be achieved by the collision avoidance steering assist control. Thereby, the operability of steering the vehicle by the driver and the safety of the movement of the vehicle can be improved.

According to further another aspect of the invention, the electronic control unit may be configured to limit a steering torque for automatically steering the vehicle generated by the lane return steering assist control to a lane return steering torque upper limit. According to this aspect, the lane return steering torque upper limit is set to a value that the driver can perform the counter lane return steering operation when the steering torque for automatically steering the vehicle generated by the lane return steering assist control is limited to the lane return steering torque upper limit.

The execution of the lane return steering assist control continues until the second predetermined time elapses from starting the execution of the lane return steering assist control even when the driver performs the counter lane return steering operation. According to this aspect of the invention, the lane return steering torque upper limit is set to the value that the driver can perform the counter lane return steering operation even when the steering torque generated by the lane return steering assist control corresponds to the lane return steering torque upper limit. Therefore, the driver can perform the counter lane return steering operation against automatically steering the vehicle intended to be achieved by the lane return steering assist control. Thereby, the operability of steering the vehicle by the driver and the safety of the movement of the vehicle can be improved.

According to further another aspect of the invention, the collision avoidance steering operation may be a driver's operation to turn a steering wheel of the vehicle for avoiding the collision of the vehicle with the obstacle.

According to further another aspect of the invention, the counter collision avoidance steering operation may be a driver's operation to turn a steering wheel of the vehicle against automatically steering the vehicle intended to be achieved by the collision avoidance steering assist control.

According to further another aspect of the invention, the counter lane return steering operation may be a driver's operation to turn a steering wheel of the vehicle against automatically steering the vehicle intended to be achieved by the lane return steering assist control.

According to further another aspect of the invention, the collision avoidance steering assist control may include a process to set a target collision avoidance path which the vehicle can avoid the collision with the detected obstacle when the vehicle moves along the target collision avoidance path and a process to automatically steer the vehicle to cause the vehicle to move along the target collision avoidance path to avoid the collision of the vehicle with the detected obstacle.

According to further another aspect of the invention, the collision avoidance steering assist control may further include a process to acquire candidate movement paths which the vehicle can avoid the collision with the detected obstacle when the vehicle moves along each of the candidate movement paths. In this case, the process to set the target collision avoidance path may be a process to set one of the candidate movement paths as the target collision avoidance path.

The other objects, features and accompanied advantages of the present invention can be easily understood from the description of the embodiment of the present invention along with the drawings.

DESCRIPTION OF THE PREFERRED EMBODIMENTS

Figure 1:
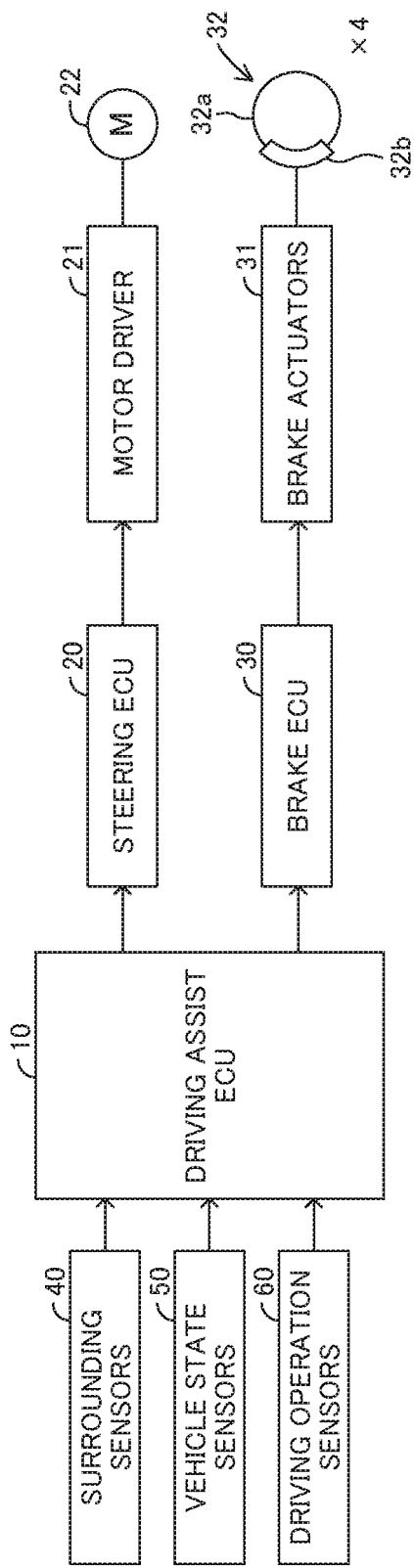
FIG. 1 is a schematic system configuration view for showing a vehicle driving assist apparatus according to an embodiment of the invention.

Below, an embodiment of the invention will be described with reference to the drawings. FIG. 1 is a schematic system configuration view for showing a vehicle driving assist apparatus according to the embodiment of the invention.

The vehicle driving assist apparatus includes a driving assist ECU 10, a steering ECU 20, and a brake ECU 30. Each of the ECUs 10, 20, and 30 includes a micro-computer as a main component, and the ECUs 10, 20, and 30 are connected to each other via a CAN (Controller Area Network) not shown such that any of the ECUs 10, 20, and 30 can send signals to the remainder of the ECUs 10, 20, and 30 and receive the signals from the remainder of the ECUs 10, 20, and 30. The term "ECU" stands for Electronic Control Unit. In this description, the micro-computer includes a CPU and memory devices such as a ROM, a RAM, etc. The CPU realizes various functions by executing instructions and programs stored in the ROM. The driving assist apparatus according to the embodiment is mounted on a vehicle. Hereinafter, the vehicle on which the driving assist apparatus according to the embodiment, will be referred to as "the own vehicle 100".

At least one surrounding sensor 40, vehicle state sensors 50, and driving operation sensors 60 are electrically connected to the driving assist ECU 10. The at least one surrounding sensor 40 has a function of acquiring information on (i) a road ahead of the own vehicle 100 and (ii) standing objects existing on the road. The standing objects are, for example, moving objects and fixed objects. The moving objects are, for example, walking persons, bicycles, vehicles, etc. The fixed objects are, for example, power poles, trees, guardrails, etc.

The at least one surrounding sensor 40 includes, for example, at least one radar sensor and at least one camera sensor. The at least one radar sensor emits radio waves of a millimeter wave range to around the own vehicle 100. In particular, the at least one radar sensor emits the radio waves at least to an area ahead of the own vehicle 100. Hereinafter, the radio wave of the millimeter wave range will be referred to as "the millimeter wave". When there is the standing object reflecting the millimeter wave in an area of the at least one radar sensor emitting the millimeter wave, the at least one radar sensor calculates data on (i) the standing object reflecting the millimeter wave and (ii) a relative relationship between the own vehicle 100 and the standing object, based on the reflected millimeter wave. The relative relationship is, for example, (i) a distance between the own vehicle 100 and the standing object, (ii) a direction of the standing object relative to the own vehicle 100, and (iii) a relative movement speed of the standing object relative to the own vehicle 100. The at least one camera sensor includes, for example, at least one stereo camera or at least one monocular camera. The at least one camera sensor takes a view ahead of the own vehicle 100. Then, the at least one camera sensor calculates (i) a shape of the road ahead of the own vehicle 100, (ii) data on the standing object, (iii) the relative relationship between the own vehicle 100 and the standing object, etc., based on image data of the taken view. In addition, the at least one camera sensor recognizes lane markings such as white lane markings provided on the left and right sides of the own vehicle 100. Then, the at least one camera sensor calculates (i) the shape of the road and (ii) a relationship in position between the road and the own vehicle 100, based on the recognized lane markings.

Hereinafter, the information on the standing object calculated by the at least one surrounding sensor 40 will be referred to as "the object information". The at least one surrounding sensor 40 send the object information to the driving assist ECU 10 with a predetermined period. It should be noted that the at least one surrounding sensor 40 may not include both of the at least one radar sensor and the at least one camera sensor. The at least one surrounding sensor 40 may include the at least one camera sensor only. Also, it should be noted that information acquired from a navigation system may be used as (i) the information on the shape of the road on which the own vehicle 100 moves and (ii) the relationship in position between the road and the own vehicle 100.

The vehicle state sensors 50 include, for example, a vehicle movement speed sensor, vehicle wheel rotation speed sensors, a longitudinal acceleration sensor, a lateral acceleration sensor, a yaw rate sensor, etc. The vehicle movement speed sensor detects a movement speed of the own vehicle 100. Each of the vehicle wheel rotation speed sensors detects a rotation speed of a respective vehicle wheel. The longitudinal acceleration sensor detects a longitudinal acceleration of the own vehicle 100. The lateral acceleration sensor detects a lateral acceleration of the own vehicle 100. The yaw rate sensor detects a yaw rate of the own vehicle 100.

The driving operation sensors 60 include a steering angle sensor, a steering torque sensor, a brake operation amount sensor, a brake switch, a setting switch, etc. The steering angle sensor detects a steering angle. The steering torque sensor detects a steering torque. The brake operation amount sensor detects an operation amount of a brake pedal. The brake switch detects an operation of the brake pedal. The setting switch sets whether to execute various driving assist controls, etc. Plus and minus signs of the steering angle specify a direction of steering the own vehicle 100 achieved by the steering angle. In other words, the plus and minus sings of the steering angle specify whether the own vehicle 100 is turned leftward or rightward by the steering angle. Further, plus and minus signs of the steering torque specify the direction of steering the own vehicle 100 achieved by the steering torque. In other words, the plus and minus sings of the steering torque specify whether the own vehicle 100 is turned leftward or rightward by the steering torque. A steering rate can be calculated by differentiating the steering angle. Plus and minus signs of the steering rate specify the direction of steering the own vehicle 100 achieved by the steering rate. In other words, the plus and minus sings of the steering rate specify whether the own vehicle 100 is turned leftward or rightward by the steering rate.

The driving assist ECU 10 has a function of executing a collision avoidance steering assist control and a lane return steering assist control as the driving assist control.

The steering ECU 20 is a control device of an electric power steering system. The steering ECU 20 is electrically connected to a motor driver 21. The motor driver 21 is electrically connected to a steering motor 22. The steering motor 22 is installed in a steering mechanism (not shown). A rotor of the steering motor 22 is rotated by electric power supplied from the motor driver 21. Left and right wheels-to-be-steered of the own vehicle 100 are steered by rotation of the rotor. Hereinafter, the left and right wheels-to-be-steered of the own vehicle 100 will be referred to as "the steered wheels of the own vehicle 100" or "the vehicle steered wheels". The steering ECU 20 normally detects the steering torque generated by a driver of the own vehicle 100. Then, the steering ECU 20 causes the steering motor 22 to generate assist torque, depending on the detected steering torque. When the steering ECU 20 receives a steering control command or steering torque command sent from the driving assist ECU 10, the steering ECU 20 drives and controls the steering motor 22 to steer the vehicle steered wheels in accordance with the steering control command or the steering torque command.

The brake ECU 30 is electrically connected to brake actuators 31. Each of the brake actuators 31 is provided between a master cylinder (not shown) and a respective friction brake mechanism 32. The master cylinder is a device for compressing hydraulic oil in response to a pressing force applied to the brake pedal by the driver. The friction brake mechanisms 32 are provided to a left front wheel, a right front wheel, a left rear wheel, and a right rear wheel of the own vehicle 100, respectively. Each of the friction brake mechanisms 32 includes a brake disc 32a and a brake caliper 32b. Each of the brake discs 32a is secured to the respective wheel of the own vehicle 100. The brake calipers 32b are secured to a body of the own vehicle 100. Hydraulic pressure of the hydraulic oil is applied to each of the friction brake mechanisms 32 from the respective brake actuator 31. Each of the friction brake mechanisms 32 activates a respective wheel cylinder by the hydraulic pressure of the hydraulic oil to press a respective brake pad to the respective brake disc 32a, thereby generating friction braking force. Each of the wheel cylinders is mounted in the respective brake caliper 32b.

The brake actuators 31 are known actuators for adjusting the hydraulic pressure applied to the wheel cylinders mounted in the brake calipers 32b. The brake actuators 31 apply the hydraulic pressure to the wheel cylinders, depending on control commands sent from the brake ECU 30 to generate the braking force on the left front wheel, the right front wheel, the left rear wheel, and the right rear wheel of the own vehicle 100, respectively.

Next, the driving assist control executed by the driving assist ECU 10 will be described. The driving assist ECU 10 executes the collision avoidance steering assist control and the lane return steering assist control as the driving assist control. The collision avoidance steering assist control is a control to automatically steer the vehicle steered wheels to avoid a collision of the own vehicle 100 with an obstacle. The lane return steering assist control is a control to automatically steer the vehicle steered wheels to prevent the own vehicle 100 from departing from an original movement lane in which the own vehicle 100 moves before an execution of the collision avoidance steering assist control is started. An execution of the lane return steering assist control is started when the execution of the collision avoidance steering assist control is terminated.

In order to determine whether to execute the collision avoidance steering assist control, the driving assist ECU 10 determines whether there is the obstacle ahead of the own vehicle 100. When the driving assist ECU 10 detects the obstacle ahead of the own vehicle 100, the driving assist ECU 10 calculates an index value representing a possibility that the own vehicle 100 collides with the detected obstacle. Any of various known methods can be used as a method for detecting the obstacle in this embodiment. Also, any of various known methods can be used as a method for determining whether there is the possibility that the own vehicle 100 collides with the obstacle in this embodiment.

For example, the driving assist ECU 10 generates information on the road on which the own vehicle 100 will move with a predetermined calculation cycle, based on the object information sent from the at least one surrounding sensor 40. For example, the driving assist ECU 10 sets a coordinate system widely ahead of the own vehicle 100. The coordinate system has an origin corresponding to a center position of a front end of the own vehicle 100. The driving assist ECU 10 generates (i) coordinate information on coordinate or (ii) position information on positions of the ground, the standing object, the white lane markings by using the coordinate system. Thereby, the driving assist ECU 10 realizes a shape of a present movement lane in which the own vehicle 100 moves presently. The present movement lane is defined by the left and right white lane markings. Further, the driving assist ECU 10 realizes the position and the orientation of the own vehicle 100 in the present movement lane. Furthermore, the driving assist ECU 10 realizes a relative position of the standing object relative to the own vehicle 100.

The driving assist ECU 10 calculates a turning radius of turning the own vehicle 100, based on (i) the yaw rate detected by the yaw rate sensor and (ii) the vehicle movement speed detected by the vehicle movement speed sensor. Then, the driving assist ECU 10 calculates a movement trajectory of the own vehicle 100, based on the calculated turning radius. The driving assist ECU 10 determines whether the standing object is the moving object or a stopped object, based on a change of the position of the standing object. When the driving assist ECU 10 determines that the standing object is the moving object, the driving assist ECU 10 calculates a movement trajectory of the standing object. For example, a movement speed of the standing object in a longitudinal direction of the standing object, i.e., in a movement direction of the own vehicle 100 can be calculated, based on a relationship between the movement speed of the own vehicle 100 and the relative movement speed of the standing object relative to the own vehicle 100. The movement speed of the standing object in a right-left direction or a horizontal direction of the standing object can be calculated, based on a change amount of a distance between a lateral end of the standing object and the white lane marking, etc. The lateral end of the standing object is detected by the at least one surrounding sensor 40. The driving assist ECU 10 calculates the movement trajectory of the standing object, based on (i) the calculated movement speed of the standing object in the longitudinal direction of the standing object and (ii) the calculated movement speed of the standing object in the horizontal direction of the standing object. Alternatively, the driving assist ECU 10 may calculate the movement trajectory of the standing object, based on (i) the calculated movement trajectory of the own vehicle 100 and (ii) the distance between the own vehicle 100 and the standing object. The distance between the own vehicle 100 and the standing object is detected by the at least one surrounding sensor 40.

The driving assist ECU 10 determines whether the own vehicle 100 collides with the standing object when the own vehicle 100 continues to move with maintaining a movement condition of the own vehicle 100 at the present movement condition, based on (i) the position of the standing object and (i) the movement trajectory of the own vehicle 100. When the standing object is the moving object, the driving assist ECU 10 calculates the movement trajectory of the standing object. Then, the driving assist ECU 10 determines whether the own vehicle 100 collides with the standing object, based on (i) the calculated movement trajectory of the standing object and (ii) the calculated movement trajectory of the own vehicle 100.

When the driving assist ECU 10 determines that the own vehicle 100 collides with the standing object, the driving assist ECU 10 realizes the standing object as the obstacle. The driving assist ECU 10 calculates a distance L between the obstacle and the own vehicle 100. In addition, the driving assist ECU 10 calculates a relative movement speed Vr between the own vehicle 100 and the obstacle. The driving assist ECU 10 calculates a predicted collision time TTC, based on (i) the distance L, (ii) the relative speed Vr, and (iii) a following equation (1). The predicted collision time TTC is a time predictively taken for the own vehicle 100 to collide with the obstacle. In other words, the predicted collision time TTC is a time predictively remaining until the own vehicle 100 collides with the obstacle.

$$TTC=L/Vr \tag{1}$$

The driving assist ECU 10 determines that there is a high possibility that the own vehicle 100 collides with the obstacle when the predicted collision time TTC is equal to or shorter than a predetermined collision determination threshold TTC0.

Figure 6:
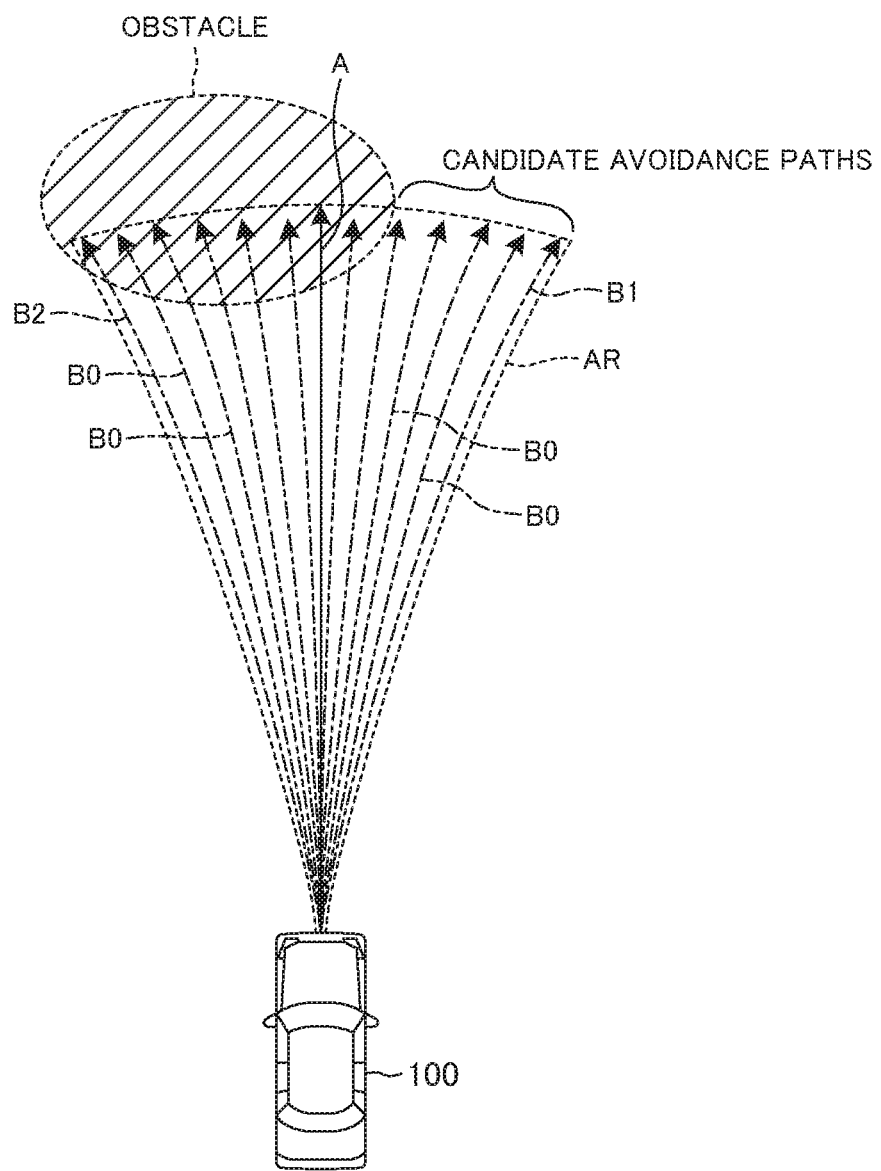
FIG. 6 is a view for showing candidate collision avoidance paths used for avoiding a collision of the vehicle with an obstacle.

When the driving assist ECU 10 determines that there is the high possibility that the own vehicle 100 collides with the obstacle, the driving assist ECU 10 calculates a target collision avoidance path with the predetermined calculation cycle. The target collision avoidance path is a path along which the own vehicle 100 should move for avoiding the collision of the own vehicle 100 with the obstacle. For example, as shown in FIG. 6, the driving assist ECU 10 specifies a predicted movement path A. The predicted movement path A is a path along which the own vehicle 100 predictively moves, assuming that the own vehicle 100 moves with maintaining the movement condition of the own vehicle 100 at the present movement condition. In addition, the driving assist ECU 10 specifies a predicted movement path B1. The predicted movement path B1 is a path along which the own vehicle 100 predictively moves with a lateral acceleration acquired by adding a maximum lateral force change amount ΔGy to the present lateral acceleration Gy0 of the own vehicle 100. The maximum lateral force change amount ΔGy is a maximum change amount of a lateral force which turns the own vehicle 100 safely at the present movement speed of the own vehicle 100. In addition, the driving assist ECU 10 specifies a predicted movement path B2. The predicted movement path B2 is a path along which the own vehicle 100 predictively moves with a lateral acceleration acquired by subtracting the maximum lateral force change amount ΔGy from the present lateral acceleration Gy0 of the own vehicle 100.

The driving assist ECU 10 acquires paths B0 as candidate collision avoidance paths. The paths B0 is in a movement range AR defined by the predicted movement path B1 and the predicted movement path B2. A difference in the lateral acceleration between the own vehicle 100 moving along the certain path B0 and the own vehicle 100 along the path B0 next to the certain path B0 is a predetermined constant value. The driving assist ECU 10 sets the target collision avoidance path, based on a degree of the obstacle interfering with each of the candidate collision avoidance paths. The target collision avoidance path is a path along which the own vehicle 100 turns with a minimum lateral acceleration to avoid the collision of the own vehicle 100 with the obstacle without interfering with the obstacle.

The driving assist ECU 10 determines that the collision avoidance steering assist control is effective when (i) there is the high possibility that the own vehicle 100 collides with the obstacle, and (ii) there is calculated the target collision avoidance path to avoid the collision of the own vehicle 100 with the obstacle by causing the own vehicle 100 to move along the target collision avoidance path.

<Driving Assist Control Routine>

Figure 2:
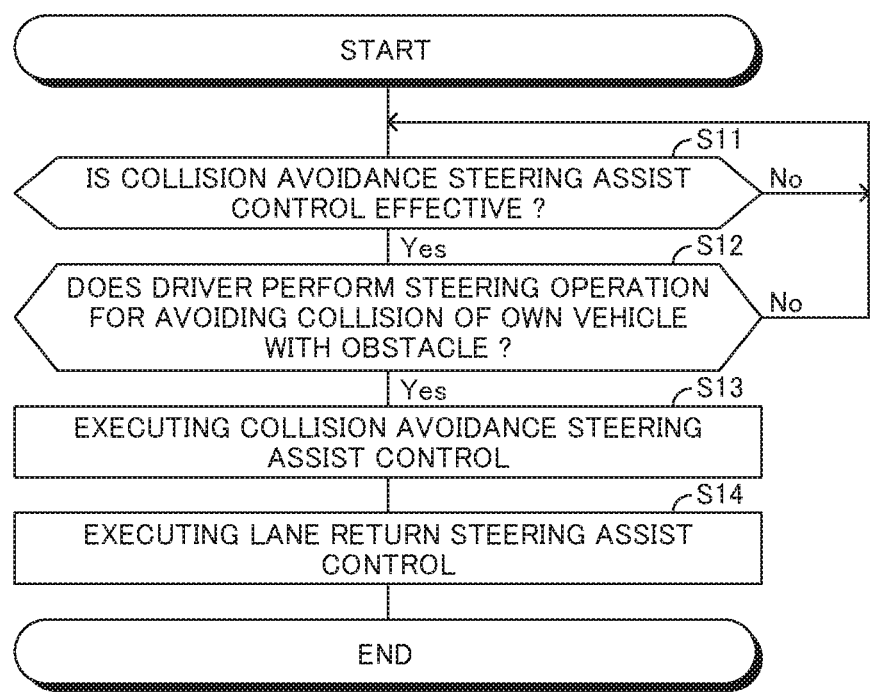
FIG. 2 is a view for showing a flowchart of a driving assist control routine.

Next, the driving assist control executed by the driving assist ECU 10 will be described. FIG. 2 shows a flowchart of a driving assist control routine.

The driving assist ECU 10 is configured to repeatedly execute a process to calculate the possibility that the own vehicle 100 collides with the obstacle, i.e., a process to calculate the predicted collision time TTC in addition to executing the driving assist control routine. When the possibility that the own vehicle 100 collides with the obstacle is higher than a reference level, i.e., the predicted collision time TTC is equal to or shorter than the predetermined collision determination threshold TTC0 (TTC TTC0), the driving assist ECU 10 is configured to repeatedly execute a process to calculate the target collision avoidance path.

At a step S11, the driving assist ECU 10 determines whether the collision avoidance steering assist control is effective. In other words, at the step S11, the driving assist ECU 10 determines whether (i) the possibility that the own vehicle 100 collides with the obstacle is higher than the reference level, and (ii) there is calculated the target collision avoidance path along which the own vehicle 100 should move for avoiding the collision of the own vehicle 100 with the obstacle. The driving assist ECU 10 repeatedly executes a determination process of the step S11 with the predetermined calculation cycle until the driving assist ECU 10 determines that the collision avoidance steering assist control is effective. When the driving assist ECU 10 determines that the collision avoidance steering assist control is effective, the driving assist ECU 10 proceeds with the process to a step S12 to determine whether the driver performs an operation for steering the own vehicle 100 for avoiding the collision of the own vehicle 100 with the obstacle. Hereinafter, the operation for steering the own vehicle 100 performed by the driver will be referred to as "the steering operation" or "the driver's steering operation".

When the driver notices the obstacle, the driver turns a steering wheel of the own vehicle 100 suddenly for avoiding the collision of the own vehicle 100 with the obstacle. Therefore, at the step S12, the driving assist ECU 10 determines whether the driver performs the steering operation for avoiding the collision of the own vehicle 100 with the obstacle, based on whether (i) the driver performs the operation for steering the own vehicle 100 in a direction for avoiding the collision of the own vehicle 100 with the obstacle, and (ii) the driver unusually suddenly turns the steering wheel. In order to determine whether the driver performs the steering operation for avoiding the collision of the own vehicle 100 with the obstacle, the driving assist ECU 10 acquires steering operation information on the steering angle, the steering rate, and the steering torque from the driving operation sensors 60. Then, the driving assist ECU 10 determines whether the driver performs the steering operation for avoiding the collision of the own vehicle 100 with the obstacle, based on the acquired steering operation information.

For example, the driving assist ECU 10 can determine the direction of steering the own vehicle 100 by the driver, based on the plus and minus signs of the steering torque. The driving assist ECU 10 can determine whether the driver suddenly turns the steering wheel, based on a magnitude or an absolute value of the steering torque. Alternatively, the driving assist ECU 10 can determine whether the driver suddenly turns the steering wheel, based on a magnitude or an absolute value of the steering rate. For example, the driving assist ECU 10 determines that the driver suddenly turns the steering wheel when the magnitude of the steering torque is greater than a steering torque determination threshold. Alternatively, the driving assist ECU 10 determines that the driver suddenly turns the steering wheel when the magnitude of the steering rate is greater than a steering rate determination threshold. In this regard, for example, the driving assist ECU 10 may use a condition that a magnitude of the steering angle is greater than a steering angle determination threshold in addition to a condition that the magnitude of the steering torque is greater than the steering torque determination threshold for determining that the driver suddenly turns the steering wheel. Thereby, the driving assist ECU 10 does not determine that the driver suddenly turns the steering wheel when the large steering torque is temporarily detected due to an input into tires of the own vehicle 100 from the outside of the own vehicle 100, e.g., from a surface of the road. Alternatively, the driving assist ECU 10 may use the condition that the magnitude of the steering angle is greater than the steering angle determination threshold in addition to a condition that the magnitude of the steering rate is greater than the steering rate determination threshold for determining that the driver suddenly turns the steering wheel. Thereby, the driving assist ECU 10 does not determine that the driver suddenly turns the steering wheel when the large steering rate is temporarily detected due to the input into the tires of the own vehicle 100, e.g. from the surface of the road.

A functional section of the driving assist ECU 10 to execute determination processes of the steps S11 and S12 corresponds to collision avoidance steering operation determination means of the invention.

When the driving assist ECU 10 does not determine that the driver performs the steering operation for avoiding the collision of the own vehicle 100 with the obstacle, i.e., the driving assist ECU 10 determines "No" at the step S12, the driving assist ECU 10 returns the process to the step S11 to execute the determination processes of the steps S11 and S12 described above again.

The driving assist ECU 10 repeatedly executes the determination processes of the steps S11 and S12 until the driving assist ECU 10 determines that the driver performs the steering operation for avoiding the collision of the own vehicle 100 with the obstacle. When the driving assist ECU 10 determines that the driver performs the steering operation for avoiding the collision of the own vehicle 100 with the obstacle, i.e., the driving assist ECU 10 determines "Yes" at the step S12, the driving assist ECU 10 proceeds with the process to a step S13 to execute the collision avoidance steering assist control. When the driving assist ECU 10 starts an execution of the collision avoidance steering assist control, the driving assist ECU 10 calculates a target yaw rate for causing the own vehicle 100 to move along the target collision avoidance path calculated as described above. The driving assist ECU 10 calculates a target steering torque Tr1* for achieving the target yaw rate, based on the target yaw rate. The driving assist ECU 10 previously stores a map (not shown) of the target steering torques Tr1*. The target steering torque Tr1* acquired from the map increases as a difference between the target yaw rate and the actual yaw rate, i.e., the yaw rate detected by the yaw rate sensor increases. The driving assist ECU 10 calculates the target steering torque Tr1* by referring to the map. The driving assist ECU 10 calculates the target steering torque Tr1* with the predetermined calculation cycle.

There is set an upper limit Trmax of the target steering torque Tr1*. The upper limit Trmax is set to a value which allows the driver to perform the steering operation against the steering torque generated by the collision avoidance steering assist control. In other words, the upper limit Trmax is set to the value that the driver can perform the steering operation, overcoming the steering torque generated by the collision avoidance steering assist control. Therefore, the upper limit Trmax is set to the value smaller than a maximum driver-generated steering torque Trdmax by a predetermined margin. The maximum driver-generated steering torque is a torque that the driver can generally generate by turning the steering wheel to a maximum extent.

The driving assist ECU 10 sends a steering torque command to the steering ECU 20 each time the driving assist ECU 10 calculates the target steering torque Tr1*. This steering torque command represents the target steering torque Tr1*. The steering ECU 20 controls switching elements of the motor driver 21 in accordance with the steering torque command to control energization of the steering motor 22 so as to cause the steering motor 22 to generate the steering torque corresponding to the target steering torque Tr1*. Thereby, the vehicle steered wheels are steered to cause the own vehicle 100 to move along the target collision avoidance path.

During the execution of the collision avoidance steering assist control, the driver can move the own vehicle 100 along the target collision avoidance path with the driver's steering operation being assisted by the steering torque generated by the steering motor 22. Therefore, the driver's steering operation is assisted by the steering torque generated by the steering motor 22 even when the steering torque generated by the driver for avoiding the collision of the own vehicle 100 with the obstacle is short. Thereby, the collision of the own vehicle 100 with the obstacle can be avoided.

When the driving assist ECU 10 determines that the own vehicle 100 has avoided the collision with the obstacle, the driving assist ECU 10 terminates or finishes the execution of the collision avoidance steering assist control. Then, the driving assist ECU 10 proceeds with the process to a step S14 to execute the lane return steering assist control.

While the collision avoidance steering assist control is executed, the direction of the movement of the own vehicle 100 becomes non-parallel to a direction of extension of the original movement lane by the automatic steering of the own vehicle 100 realized by the collision avoidance steering control. Thus, if the own vehicle 100 continues to move in the direction non-parallel to the direction of the extension of the original movement lane, the own vehicle 100 departs from the original movement lane. Accordingly, the driving assist ECU 10 executes the lane return steering assist control to automatically steer the steered wheels of the own vehicle 100 to prevent the own vehicle 100 from departing from the original movement lane. An execution of the lane return steering assist control is started at a point of time when the own vehicle 100 has avoided the collision with the obstacle, and the execution of the collision avoidance steering assist control is terminated.

Figure 7:
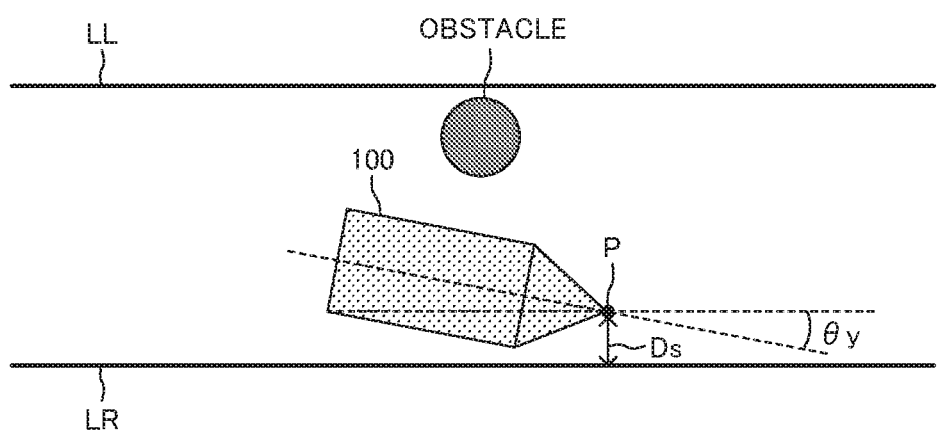
FIG. 7 is a plan view for showing white lane markings LL and LR, a side distance Ds, and a yaw angel θy used in executing a lane return steering assist control.

The driving assist ECU 10 realizes the positional relationship of the own vehicle 100 relative to the original movement lane, based on the object information sent from the at least one surrounding sensor 40. As shown in FIG. 7, the driving assist ECU 10 acquires a yaw angle θy and side distances Ds used for executing the lane return steering assist control. The yaw angle θy is a gap angle between the direction of the extension of the original movement lane and the movement direction of the own vehicle 100. One of the side distances Ds is a distance from a reference point P of the own vehicle 100 to the left white lane marking LL. The other side distance Ds is a distance from the reference point P of the own vehicle 100 to the right white lane marking LR. In this embodiment, the reference point P locates at the center position of the front end of the own vehicle 100. In this regard, the reference point P is not limited to the center position of the front end of the own vehicle 100. The driving assist ECU 10 selects one of the side distances Ds from the reference point P to one of the white lane markings, which the own vehicle 100 is likely to cross. In other words, the driving assist ECU 10 selects one of the side distances Ds from the reference point P to one of the white lane markings, toward which the own vehicle 100 moves. In addition, the driving assist ECU 10 acquires a curvature v of the original movement lane from the at least one surrounding sensor 40. In other words, the driving assist ECU 10 acquires an inverse number of a road radius R of the original movement lane from the at least one surrounding sensor 40.

The driving assist ECU 10 calculates a target steering torque Tr2*, based on a following equation (2) as a control amount used for executing the lane return steering assist control.

$$Tr2^* = K1^* v + K2^* Ds' + K3^* \theta y \quad (2)$$

Values K1, K2, and K3 are control gains, respectively. A value Ds' is set, depending on the selected side distance Ds. In particular, when the reference point P locates inside of the target white lane marking, the value Ds' is set to a value which increases as the reference point P approaches a target white lane marking, i.e., the selected side distance Ds decreases. In other words, when the reference point P locates in the original movement lane, the value Ds' is set to the value which decreases as the reference point P approaches the target white lane marking. It should be noted that the target white lane marking is the white lane marking that the lane return steering assist control intends to prevent the own vehicle 100 from departing from. Further, when the reference point P locates outside of the target white lane marking, the value Ds' is set to a value acquired by adding a variable value to a base value. The variable value is a value which increases as a distance between the reference point P outside of the target white lane marking and the target white lane marking increases. The base value is the side distance Ds when the reference point P is on the target white lane marking. In other words, the base value is the side distance Ds of zero. Thereby, the value Ds' increases as a distance between the reference point P and a center line of the original movement lane increases.

A first term (=K1*v) on the right side in the equation (2) is a torque component which functions in a feedforward manner. This torque component is defined, depending on the curvature v of the original movement lane. A second term (=K2*Ds') on the right side in the equation (2) is a torque component which functions in the feedback manner. This torque component functions to return the own vehicle 100 toward the center line of the original movement lane. A third term (=K3*θy) on the right side in the equation (2) is a torque component which also functions in the feedback manner. This torque component functions to decrease the yaw angle θy. In other words, this torque component functions to decrease a deviation between the movement direction of the own vehicle 100 and the direction of the extension of the original movement lane.

There is also set an upper limit Trmax of the target steering torque Tr2*. The upper limit Trmax is set to a value which allows the driver to perform the steering operation against the steering torque generated by the lane return steering assist control. In other words, the upper limit Trmax is set to the value that the driver can perform the steering operation, overcoming the steering torque generated by the lane return steering assist control. Therefore, the upper limit Trmax is set to the value smaller than a maximum driver's steering torque Trdmax by a predetermined margin. The maximum driver's steering torque is a torque that the driver can generally generate by turning the steering wheel to a maximum extent.

The driving assist ECU 10 sends a steering torque command to the steering ECU 20 each time the driving assist ECU 10 calculates the target steering torque Tr2*. This steering torque command represents the target steering torque Tr2*. The steering ECU 20 controls the switching elements of the motor driver 21 in accordance with the steering torque command to control the energization of the steering motor 22 so as to cause the steering motor 22 to generate the steering torque corresponding to the target steering torque Tr2*. Thereby, the vehicle steered wheels are steered to return the own vehicle 100 into the original movement lane.

When (i) the own vehicle 100 is in the original movement lane, and (ii) the movement direction of the own vehicle 100 becomes parallel to the direction of the extension of the original movement lane, the driving assist ECU 10 terminates the execution of the lane return steering assist control.

At the step S14, the driving assist ECU 10 terminates the execution of the lane return steering assist control and thus, terminates the execution of the driving assist control routine.

When the driving assist control, i.e., the collision avoidance steering assist control or the lane return steering assist control is executed, and the driver steers the own vehicle 100 against automatically steering the own vehicle 100 intended to be achieved by the driving assist control, the driving assist control should be preferably cancelled in consideration of the driver's steering operation. For example, when the direction of steering the own vehicle 100 intended to be achieved by the driving assist control is opposite to the direction of steering the own vehicle 100 intended to be achieved by the driver, the driver's steering operation is against automatically steering the own vehicle 100 intended to be achieved by the driving assist control. In particular, when (i) a process to steer the own vehicle 100 intended to be achieved by the driving assist control is to turn the own vehicle 100 leftward, and (ii) the driver's steering operation is to turn the own vehicle 100 rightward, the driver's steering operation is against automatically steering the own vehicle 100 intended to be achieved by the driving assist control. In addition, when (i) the process to steer the own vehicle 100 intended to be achieved by the driving assist control is to turn the own vehicle 100 rightward, and (ii) the driver's steering operation is to turn the own vehicle 100 leftward, the driver's steering operation is against automatically steering the own vehicle 100 intended to be achieved by the driving assist control. When the process to steer the own vehicle 100 intended to be achieved by the driving assist control is against the driver's steering operation, the driving assist control interrupts the driver's steering operation.

Hereinafter, the driver's steering operation against automatically steering the own vehicle 100 intended to be achieved by the driving assist control will be referred to as "the steering overriding operation". It should be noted that the driver's steering operation against automatically steering the own vehicle 100 intended to be achieved by the collision avoidance steering assist control corresponds to a counter collision avoidance steering operation of the invention. In addition, it should be noted that the driver's steering operation against automatically steering the own vehicle 100 intended to be achieved by the lane return steering assist control corresponds to a counter lane return steering operation of the invention.

For example, when the detected driver's steering operation is to steer the own vehicle 100 in a direction opposite to a direction of steering the own vehicle 100 to be achieved by the target control amount set by the driving assist control, the detected driver's steering operation is determined as the steering overriding operation. Further, when (i) the target control amount for automatically steering the own vehicle 100 set by the driving assist control is to generate the steering torque greater than or equal to a predetermined steering torque, and (ii) the detected driver's steering operation is to hold the steering wheel, the detected driver's steering operation is determined as the steering overriding operation. Furthermore, when (i) the target control amount for automatically steering the own vehicle 100 set by the driving assist control is to maintain the steering angle at the present steering angle, and (ii) the detected driver's steering operation is to turn the steering wheel with a steering torque greater than or equal to a predetermined steering torque, the detected driver's steering operation is determined as the steering overriding operation.

When the driving assist ECU 10 executes the driving assist control and detects the steering overriding operation, the driving assist ECU 10 basically cancels the execution of the driving assist control in consideration of the driver's intension represented by the driver's steering operation.

In this regard, if the execution of the driving assist control is always cancelled in response to a detection of the steering overriding operation, the driver's steering operation is not appropriately assisted by the driving assist control. Below, reasons thereof will be described.

The driver may not normally perform the steering operation when the driver notices that the own vehicle 100 approaches the obstacle rapidly. Alternatively, the driver may become rigid and may not perform the steering operation when the driver notices that the own vehicle 100 approaches the obstacle rapidly. In these cases, the driver may not perform the steering operation appropriately. For example, the driver may stop turning the steering wheel and hold the steering wheel. Alternatively, the driver may turn the steering wheel reversely. In these cases, the driver's steering operation is detected as the steering overriding operation, and the driver's steering operation is not assisted by the driving assist control.

Accordingly, in the driving assist apparatus according to the embodiment, a specified period of time is set, and a cancellation of the execution of the driving assist control in response to the detection of the steering overriding operation is forbidden during the specified period of time.

Figure 5:
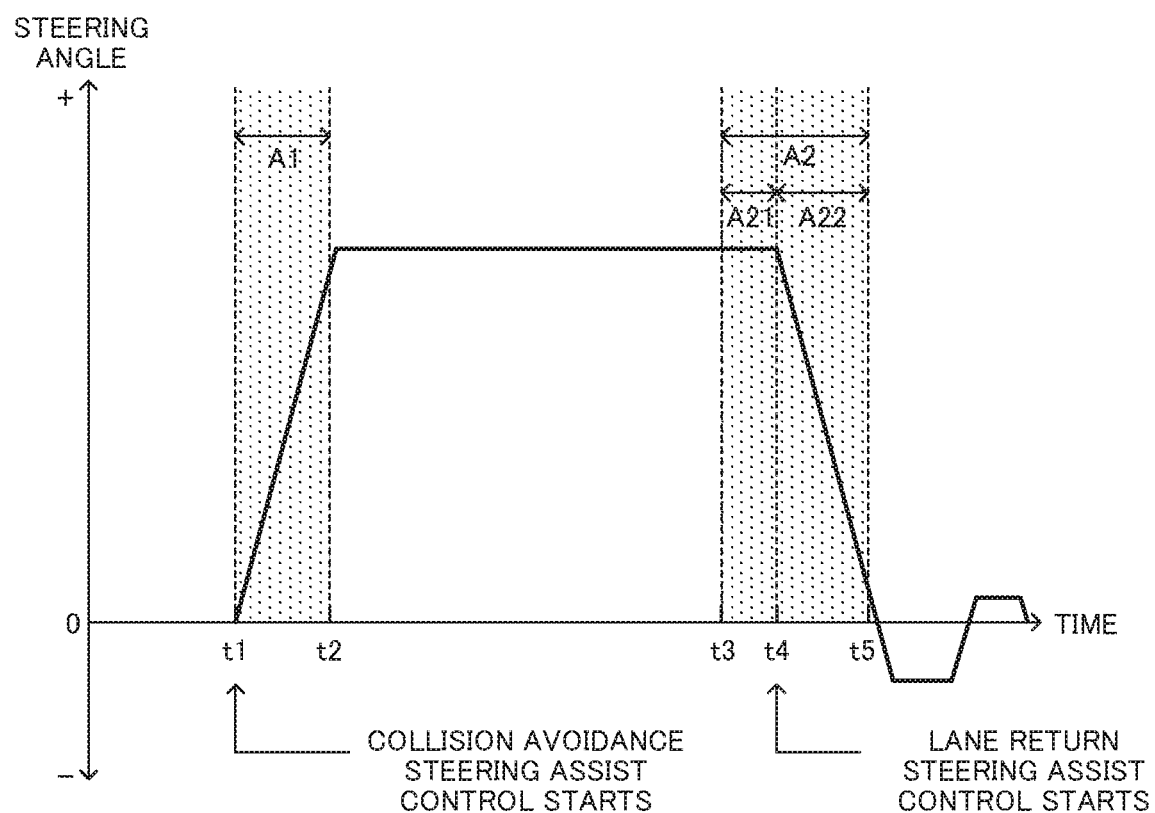
FIG. 5 is a view for showing a graph used for describing periods of time of forbidding cancelling an execution of a driving assist control.

As shown in FIG. 5, the specified period of time includes a period A1 of time from a point t1 of time to a point t2 of time. At the point t1 of time, the execution of the collision avoidance steering assist control is started. At the point t2 of time, a predetermined time elapses from starting the execution of the collision avoidance steering assist control. In addition, the specified period of time includes a period A2 of time from a point t3 of time to a point t5 of time. The period A2 of time is a period of time around a base point t4 of time when the driving assist control is changed from the collision avoidance steering assist control to the lane return steering assist control. At the base point t4 of time, the execution of the collision avoidance steering assist control is terminated or finished. Also, at the base point t4 of time, the execution of the lane return steering assist control is started. The period A2 of time corresponds to a sum of a period A21 of time and a period A22 of time. The period A21 of time is a period of time from the point t3 of time to the base point t4 of time. The period A22 of time is a period of time from the base point t4 of time to the point t5 of time. The point t3 of time is a point of time before the base point t4 of time by a predetermined time. At the point t5 of time, a predetermined time elapses from the base point t4 of time.

Below, a steering overriding operation control applied to the driving assist control will be described. The steering overriding operation control includes (i) a cancellation process to cancel the execution of the driving assist control in response to the detection of the steering overriding operation and (ii) a cancellation forbiddance process to forbid the cancellation of the execution of the driving assist control in response to the detection of the steering overriding operation during the specified period.

Figure 3:
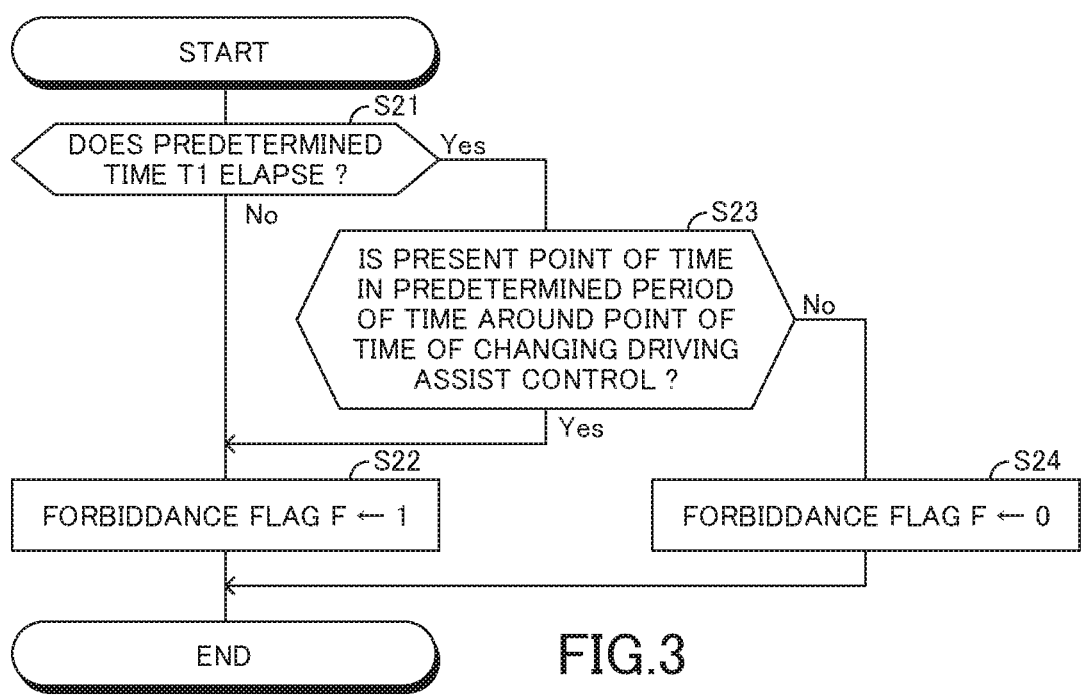
FIG. 3 is a view for showing a flowchart of a forbiddance flag setting routine.
Figure 4:
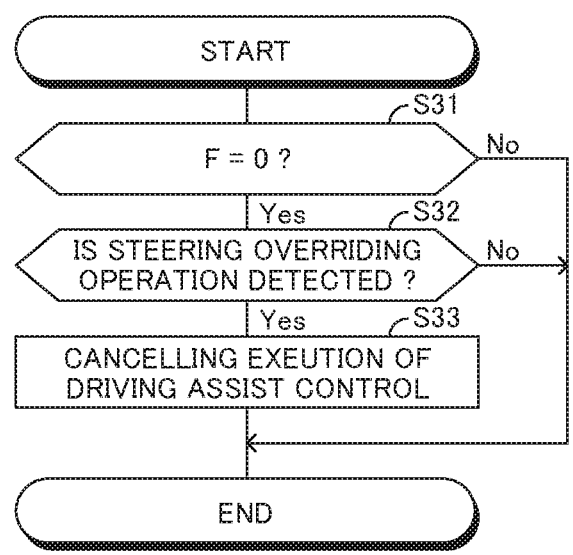
FIG. 4 is a view for showing a flowchart of an assist cancellation control routine.

The steering overriding operation control is realized by executing a forbiddance flag setting routine shown in FIG. 3 and an assist cancellation control routine shown in FIG. 4.

First, the forbiddance flag setting routine shown in FIG. 3 will be described. The driving assist ECU 10 repeatedly executes the forbiddance flag setting routine with a predetermined calculation cycle. The execution of the forbiddance flag setting routine is started in synchronization with a point of time of starting the execution of the driving assist control. In other words, the execution of the forbiddance flag setting routine is started in synchronization with a point of time of starting the execution of the collision avoidance steering assist control at the step S13.

At a step S21, the driving assist ECU 10 determines whether a predetermined time T1 elapses from starting the execution of the driving assist control. The predetermined time T1 is previously set. A determination process of the step S21 is a process to determine whether the present point of time is within the specified period A1 of time (see FIG. 5). When the predetermined time T1 does not elapse from starting the execution of the driving assist control, the driving assist ECU 10 determines "No" at the step S21 and then, proceeds with the process to a step S22 to set a value of a forbiddance flag F to "1". Therefore, the value of the forbiddance flag F has been set "1" until the predetermined time T1 elapses from starting the execution of the driving assist control.

The driving assist ECU 10 continues to execute the processes of the steps S21 and S22 until the predetermined time T1 elapses from starting the execution of the driving assist control. When the predetermined time T1 elapses from starting the execution of the driving assist control, the driving assist ECU 10 determines "Yes" at the step S21 and then, proceeds with the process to a step S23 to determine whether the present point of time is in a predetermined period around a point of time of changing the driving assist control. The point of time of changing the driving assist control is a point of time of changing the driving assist control from the collision avoidance steering assist control to the lane return steering assist control. The predetermined period of time around the point of time of changing the driving assist control is a period of time from a point of time before the point of time of changing the driving assist control by a predetermined time T21 to a point of time when a predetermined time T22 elapses from changing the driving assist control. In other words, a process of the step S23 is a determination process to determine whether the present point of time is in the specified period A2 of time (see FIG. 5).

After the driving assist control is changed from the collision avoidance steering assist control to the lane return steering assist control, the point of time of changing the driving assist control can be realized by a fact that the driving assist control is changed from the collision avoidance steering assist control to the lane return steering assist control. Also, even before the driving assist control is changed from the collision avoidance steering assist control to the lane return steering assist control, the point of time of changing the driving assist control can be predicted, based on the object information, the own vehicle information, the target collision avoidance path, etc. acquired during the execution of the collision avoidance steering assist control. Further, the driving assist ECU 10 may predict a time required for the own vehicle 100 to have avoided the collision with the obstacle, i.e., a time required for the driving assist ECU 10 to terminate the execution of the collision avoidance steering assist control at the point of time of starting the execution of the collision avoidance steering assist control. Then, based on the predicted time, the driving assist ECU 10 may predict the point of time of changing the driving assist control.

When the driving assist ECU 10 determines that the present point of time is not in the predetermined period of time around the point of time of changing the driving assist control, i.e., the driving assist ECU 10 determines "No" at the step S23, the driving assist ECU 10 proceeds with the process to a step S24. At the step S24, the driving assist ECU 10 sets the value of the forbiddance flag F to "0". On the other hand, when the driving assist ECU 10 determines that the present point of time is in the predetermined period around the point of time of changing the driving assist control, i.e., the driving assist ECU 10 determines "Yes" at the step S23, the driving assist ECU 10 proceeds with the process to the step S22 to set the value of the forbiddance flag F to "1".

The driving assist ECU 10 repeatedly executes the forbiddance flag setting routine until the driving assist ECU 10 terminates the execution of the driving assist control.

Next, the assist cancellation control routine shown in FIG. 4 will be described. The driving assist ECU 10 repeatedly executes the assist cancellation control routine in addition to executing the forbiddance flag setting routine with the predetermined calculation cycle.

When the driving assist ECU 10 starts an execution of the assist cancellation control routine, the driving assist ECU 10 proceeds with a process to a step S31 to read the present value of the forbiddance flag F set by the forbiddance flag setting routine. In addition, at the step S31, the driving assist ECU 10 determines whether the value of the forbiddance flag F is "0". When the value of the forbiddance flag F is "0", i.e., the driving assist ECU 10 determines "Yes" at the step S31, the driving assist ECU 10 proceeds with the process to a step S32 to determine whether the steering overriding operation is detected, i.e., the driver performs the steering operation against automatically steering the vehicle 100 intended to be achieved by the driving assist control. In particular, the driving assist ECU 10 acquires steering operation information from the driving operation sensors 60. The driving assist ECU 10 determines whether the steering overriding operation is performed by comparing the target control amount set by the driving assist control at the present point of time with an amount of steering the own vehicle 100 achieved by the driver's steering operation.

When the steering overriding operation is not detected, i.e., the driving assist ECU 10 determines "No" at the step S32, the driving assist ECU 10 terminates the execution of the assist cancellation control routine once. The driving assist ECU 10 repeatedly executes processes of the steps S31, S32 and S33 until the steering overriding operation is detected. When the steering overriding operation is detected, i.e., the driving assist ECU 10 determines "Yes" at the step S32, the driving assist ECU 10 proceeds with the process to a step S33 to cancel the execution of the driving assist control, i.e., the collision avoidance steering assist control or the lane return steering assist control. For example, when the steering overriding operation is detected while the driving assist ECU 10 executes the collision avoidance steering assist control, the lane return steering assist control as well as the collision avoidance steering assist control are not executed after the execution of the collision avoidance steering assist control is cancelled. Therefore, the driving assist control does not interrupt the driver's steering operation. It should be noted that the driving assist ECU 10 gradually decreases the target steering torque Tr1* or Tr2* after the driving assist ECU 10 cancels the execution of the driving assist control before the own vehicle 100 has avoided the collision with the obstacle.

On the other hand, when the value of the forbiddance flag F is "1", i.e., the present point of time is in the specified period of time, the driving assist ECU 10 skips the processes of the steps S32 and S33. Therefore, the cancellation of the execution of the driving assist control is forbidden during the specified period of time even when the steering overriding operation is detected. Thereby, the driver's steering operation is assisted by the driving assist control even when the driver temporarily performs the steering overriding operation at the point of time of starting the execution of the collision avoidance steering assist control or changing the driving assist control.

The driving assist ECU 10 repeatedly executes the assist cancellation control routine until the driving assist ECU 10 terminates the execution of the driving assist control.

The driving assist apparatus according to the embodiment described above achieves following technical effects.

The execution of the collision avoidance steering assist control can be started when there is detected the driver's steering operation for avoiding the collision of the own vehicle 100 with the obstacle. Thereafter, even when the driver does not perform the steering operation suitable for avoiding the collision of the own vehicle 100 with the obstacle, the driver's steering operation is not determined as the steering overriding operation during the specified period A1 of time immediately after the execution of the collision avoidance steering assist control is started. Thus, the execution of the collision avoidance steering assist control is continued. Therefore, the driver's steering operation is appropriately assisted by the collision avoidance steering assist control.

During the specified period A1 of time, the driver is induced by the turning of the steering wheel realized by the collision avoidance steering assist control. Thus, during the specified period A1 of time, the driver performs the steering operation in accord with steering the own vehicle 100 intended to be achieved by the collision avoidance steering assist control. Thereby, the driver's steering operation is assisted by the collision avoidance steering assist control even after the specified period A1 of time. On the other hand, the execution of the collision avoidance steering assist control is cancelled when the steering overriding operation is detected after the specified period A1 of time. Thereby, the collision avoidance steering assist control can be prevented from interrupting the driver's steering operation.

As a result, the driver's steering operation is assisted by the collision avoidance steering assist control while the driver performs the steering operation for avoiding the collision of the own vehicle 100 with the obstacle. For example, an appropriate steering assist torque is applied to the steering torque generated by the driver's steering operation by the collision avoidance steering assist control even when the steering torque generated by the driver's steering operation is smaller than a steering torque necessary to avoid the collision of the own vehicle 100 with the obstacle. Thus, the collision of the own vehicle 100 with the obstacle can be appropriately avoided. In addition, the driver's steering operation is assisted with the steering fitting the driver's intention of avoiding the collision of the own vehicle 100 with the obstacle by the collision avoidance steering assist control. Thus, the driver is unlikely to feel the discomfort.

When the execution of the collision avoidance steering assist control is terminated, the execution of the lane return steering assist control is started, following a termination of the execution of the collision avoidance steering assist control. At this moment, the point of time of changing the driving assist control is in the specified period A2 of time. Thus, the driver's steering operation is not determined as the steering overriding operation even when the driver's steering operation for returning the own vehicle 100 into the original movement lane is delayed. Therefore, the execution of the lane return steering assist control is continued. Thus, the driver's steering operation is assisted appropriately by the lane return steering assist control.

During the specified period A2 or A22 of time, the driver is induced by the turning of the steering wheel realized by the lane return steering assist control. Thus, the driver performs the steering operation in accord with steering the own vehicle 100 intended to be achieved by the lane return steering assist control during the specified period A2 of time. Thereby, the driver's steering operation is assisted by the lane return steering assist even after the specified period A2 of time. On the other hand, the execution of the lane return steering assist control is cancelled when the steering overriding operation is detected after the specified period A2 of time. Thereby, the lane return steering assist control can be prevented from interrupting the driver's steering operation.

The specified period A2 or A21 of time starts before the point of time of changing the driving assist control by the predetermined time T21. Thus, even when the driver performs the steering operation for returning the own vehicle 100 into the original movement lane before the driving assist control is changed from the collision avoidance steering assist control to the lane return steering assist control, the driver's steering operation for returning the own vehicle 100 into the original movement lane is not determined as the steering overriding operation. Therefore, the driver's steering operation is assisted appropriately by the lane return steering assist control even when the driver starts to perform the steering operation for returning the own vehicle 100 into the original movement lane early.

As a result, the driver's steering operation for returning the own vehicle 100 into the original movement lane is assisted appropriately by the lane return steering assist control at the same time as the termination of the execution of the collision avoidance steering assist control. For example, the appropriate steering assist torque is applied to the steering torque generated by the driver's steering operation by the lane return steering assist control even when the steering torque generated by the driver's steering operation is smaller than the steering torque necessary to return the own vehicle 100 into the original movement lane. Thus, the own vehicle 100 can be prevented from departing from the original movement lane to the outside of the original movement lane. In addition, the driver's steering operation is assisted, fitting the driver's intention of returning the own vehicle 100 into the original movement lane by the lane return steering assist control. Thus, the driver is unlikely to feel the discomfort.

Further, there are set (i) the upper limit Trmax of the target steering torque Tr1* set by the collision avoidance steering assist control and (ii) the upper limit Trmax of the target steering torque Tr2* set by the lane return steering assist control. Thus, the driver can perform the steering operation against automatically steering the own vehicle 100 intended to be achieved by the driving assist control. Thereby, the operability of the steering wheel and the safety of the movement of the own vehicle 100 can be improved.

The vehicle driving assist apparatus according to the embodiment has been described. It should be noted that the present invention is not limited to the aforementioned embodiment and various modifications can be employed within the scope of the invention.

For example, in the embodiment, (i) the period A1 of time until the predetermined time elapses from starting the execution of the collision avoidance steering assist control and (ii) the period A2 of time around the point of time of changing the driving assist control are included in the specified period of time in which the cancellation of the execution of the driving assist control is forbidden even when the steering overriding operation is detected. In this regard, the specified period of time may not include both of the periods A1 and A2 of time. That is, the specified period of time may include only the period A1 of time. Further, in the embodiment, (i) the period A21 of time immediately before the point of time of changing the driving assist control and (ii) the period A22 of time immediately after the point of time of changing the driving assist control are included in the period A2 of time. In this regard, the period A2 of time may not include both of the periods A21 and A22 of time. That is, the period A2 of time may include only the period A22 of time.

Further, the driving assist apparatus according to the embodiment executes the lane return steering assist control when the driving assist apparatus terminates the execution of the collision avoidance steering assist control. In this regard, the driving assist apparatus according to the embodiment may not execute the lane return steering assist control when the driving assist apparatus terminates the collision avoidance steering assist control. Furthermore, the lane return steering assist control may be programmed to assist the driver's steering operation to return the own vehicle 100 to the center position of the movement lane, i.e., the center position of the width of the road.

Further, the driving assist apparatus according to the embodiment performs a process to automatically steer the own vehicle 100 to avoid the collision of the own vehicle 100 with the obstacle. In this regard, for example, the driving assist apparatus according to the embodiment may be configured to execute an automatic brake control to automatically decelerate the own vehicle 100 in addition to performing the process to automatically steer the own vehicle 100 to avoid the collision of the own vehicle 100 with the obstacle. In this case, for example, the driving assist ECU 10 may send an emergency brake command to the brake ECU 30 when the predicted collision time TTC is equal to or shorter than a predetermined braking start threshold.

What is claimed is:

1. A vehicle driving assist apparatus comprising:
   at least one sensor configured to detect an obstacle existing around a vehicle to which the vehicle driving assist apparatus is applied; and
   an electronic control unit configured to:
   start, during a first time point, an execution of a collision avoidance steering assist control, in response to a determination that a possibility that the vehicle collides with the detected obstacle exceeds a reference level, wherein the collision avoidance steering assist control comprises performing a collision avoidance steering operation to automatically steer the vehicle to avoid a collision of the vehicle with the detected obstacle;
   forbid, during a first time frame, cancellation of the execution of the collision avoidance steering assist control, wherein the first time frame starts from the first time point and elapses after a first predetermined time duration has elapsed; and
   cancel, during a second time frame, the execution of the collision avoidance steering assist control, in response to a driver of the vehicle performing a counter collision avoidance steering operation, wherein the counter collision avoidance steering operation comprises steering the vehicle against the collision avoidance steering operation, and wherein the second time frame starts after the first time frame has elapsed.

2. The vehicle driving assist apparatus as set forth in claim 1, wherein the electronic control unit is further configured to:
  terminate the execution of the collision avoidance steering assist control and start, during a second time point, an execution of a lane return steering assist control, in response to the vehicle having avoided the collision with the detected obstacle, wherein the lane return steering assist control comprises performing a lane return steering operation to automatically steer the vehicle to return the vehicle into an original movement lane in which the vehicle moved before the execution of the collision avoidance steering assist control;
  forbid, during a third time frame, cancellation of the execution of the lane return steering assist control, wherein the third time frame starts from the second time point and elapses after a second predetermined time duration has elapsed; and
  cancel, during a fourth time frame, the execution of the lane return steering assist control, in response to the driver performing a counter lane return steering operation, wherein the counter lane return steering operation comprises steering the vehicle against the lane return steering operation, and wherein the fourth time frame starts after the third time frame has elapsed.

3. The vehicle driving assist apparatus as set forth in claim 2, wherein
  the electronic control unit is further configured to limit a steering torque for automatically steering the vehicle generated by the lane return steering assist control to a lane return steering torque upper limit, and
  the lane return steering torque upper limit is set to a value that the driver can perform the counter lane return steering operation when the steering torque for automatically steering the vehicle generated by the lane return steering assist control is limited to the lane return steering torque upper limit.

4. The vehicle driving assist apparatus as set forth in claim 2, wherein the counter lane return steering operation is a driver's operation to turn a steering wheel of the vehicle against automatically steering the vehicle intended to be achieved by the lane return steering assist control.

5. The vehicle driving assist apparatus as set forth in claim 1, wherein the electronic control unit is further configured to continue the execution of the collision avoidance steering assist control during a third predetermined time duration before a start, at a second time point, of execution of a lane return steering assist control, and forbid cancellation of the execution of the collision avoidance steering assist control, in response to the driver performing the counter collision avoidance steering operation during the third predetermined period of time.

6. The vehicle driving assist apparatus as set forth in claim 5, wherein the third predetermined time duration corresponds to a time period between a first predetermined point of time before the second time point and a second predetermined point of time after the second time point.

7. The vehicle driving assist apparatus as set forth in claim 1, wherein
  the electronic control unit is further configured to limit a steering torque for automatically steering the vehicle generated by the collision avoidance steering assist control to a collision avoidance steering torque upper limit, and
  the collision avoidance steering torque upper limit is set to a value that the driver can perform the counter collision avoidance steering operation when the steering torque for automatically steering the vehicle generated by the collision avoidance steering assist control is limited to the collision avoidance steering torque upper limit.

8. The vehicle driving assist apparatus as set forth in claim 1, wherein the collision avoidance steering operation is a driver's operation to turn a steering wheel of the vehicle for avoiding the collision of the vehicle with the detected obstacle.

9. The vehicle driving assist apparatus as set forth in claim 1, wherein the counter collision avoidance steering operation is a driver's operation to turn a steering wheel of the vehicle against automatically steering the vehicle intended to be achieved by the collision avoidance steering assist control.

10. The vehicle driving assist apparatus as set forth in claim 1, wherein the collision avoidance steering assist control includes:
  a process to set a target collision avoidance path which the vehicle can avoid the collision with the detected obstacle when the vehicle moves along the target collision avoidance path; and
  a process to automatically steer the vehicle to cause the vehicle to move along the target collision avoidance path to avoid the collision of the vehicle with the detected obstacle.

11. The vehicle driving assist apparatus as set forth in claim 10, wherein
  the collision avoidance steering assist control includes a process to acquire candidate movement paths which the vehicle can avoid the collision with the detected obstacle when the vehicle moves along each of the candidate movement paths, and
  the process to set the target collision avoidance path is a process to set one of the candidate movement paths as the target collision avoidance path.

12. The vehicle driving assist apparatus as set forth in claim 1, wherein the counter collision avoidance steering operation is a driver's steering operation of holding a steering wheel of the vehicle when the collision avoidance steering assist control intends to turn the vehicle by a predetermined degree or more.

13. The vehicle driving assist apparatus as set forth in claim 1, wherein the counter collision avoidance steering operation is a driver's steering operation which turns a steering wheel of the vehicle with a predetermined torque or more when the collision avoidance steering assist control intends to maintain a steering angle at a present steering angle.

* * * * *